United States Patent
Wu et al.

(10) Patent No.: US 10,380,084 B2
(45) Date of Patent: Aug. 13, 2019

(54) DATA MODEL VIEW WITH COMPLEX CALCULATION CAPABILITY

(71) Applicant: SAP SE, Walldorf (DE)

(72) Inventors: Zhiqiang Wu, Shanghai (CN); Zhongjie Fang, Shanghai (CN)

(73) Assignee: SAP SE, Walldorf (DE)

( * ) Notice: Subject to any disclaimer, the term of this patent is extended or adjusted under 35 U.S.C. 154(b) by 262 days.

(21) Appl. No.: 15/417,149

(22) Filed: Jan. 26, 2017

(65) Prior Publication Data

US 2018/0210902 A1   Jul. 26, 2018

(51) Int. Cl.
*G06F 16/00* (2019.01)
*G06F 16/21* (2019.01)

(52) U.S. Cl.
CPC .................. *G06F 16/212* (2019.01)

(58) Field of Classification Search
CPC ......... G06F 17/30554; G06F 17/30294; G06F 17/30551; G06F 17/3056; G06F 17/30607; G06F 17/30575; G06F 17/30; G06F 11/3466; G06F 17/30964; G06F 11/3636; G06F 17/243; G06F 9/451; G06F 17/30595; G06F 17/30371; G06F 9/45558; G06F 2009/45579; G06F 3/0664; G06F 16/212; G06N 99/005; H04L 67/02; H04L 67/1097; G06Q 30/0202

See application file for complete search history.

(56) References Cited

U.S. PATENT DOCUMENTS

| | | | | |
|---|---|---|---|---|
| 5,930,795 A * | 7/1999 | Chen | ................. | G06F 17/30474 717/114 |
| 7,403,901 B1 * | 7/2008 | Carley | ................... | G06Q 50/22 705/2 |
| 7,610,233 B1 * | 10/2009 | Leong | .................. | G06Q 10/087 705/26.3 |
| 8,983,900 B2 * | 3/2015 | Hegde | ..................... | G06F 16/25 707/607 |
| 2007/0143314 A1 * | 6/2007 | Thomsen | .......... | G06F 17/30289 707/E17.005 |
| 2009/0177622 A1 * | 7/2009 | Hu | ...................... | G06F 16/2272 707/E17.131 |
| 2012/0054164 A1 * | 3/2012 | Falkebo | .............. | G06F 16/2343 707/704 |
| 2014/0019473 A1 * | 1/2014 | Kamenz | ........... | G06F 17/30294 707/769 |
| 2014/0114906 A1 * | 4/2014 | Hegde | ..................... | G06F 16/25 707/602 |
| 2014/0122452 A1 * | 5/2014 | Faerber | ............. | G06F 17/30315 707/693 |
| 2014/0172827 A1 * | 6/2014 | Nos | ................... | G06F 17/30424 707/722 |

(Continued)

*Primary Examiner* — Anh Ly
(74) *Attorney, Agent, or Firm* — Klarquist Sparkman, LLP (57) ABSTRACT

Described herein is a framework for providing data model views with complex calculation capability. In accordance with one aspect, the framework receives a request to calculate target results. An object in an application layer may be invoked to perform complex calculation to generate intermediate results. The intermediate results are stored in a global temporary table. A data model view in a database layer may then be invoked to calculate the target results based on the intermediate results retrieved from the global temporary table. The calculated target results are then returned.

20 Claims, 5 Drawing Sheets

(56) References Cited

U.S. PATENT DOCUMENTS

| | | | | |
|---|---|---|---|---|
| 2014/0258217 A1* | 9/2014 | Kemmler | .......... | G06F 17/30289 |
| | | | | 707/609 |
| 2014/0314333 A1* | 10/2014 | Takahashi | ............ | A61B 6/5258 |
| | | | | 382/264 |
| 2015/0074014 A1* | 3/2015 | Radkowski | ........ | G06Q 10/0631 |
| | | | | 705/342 |
| 2016/0140175 A1* | 5/2016 | Weyerhaeuser | .. | G06F 17/30463 |
| | | | | 707/718 |
| 2016/0140241 A1* | 5/2016 | Weyerhaeuser | .. | G06F 17/30867 |
| | | | | 707/710 |
| 2016/0364445 A1* | 12/2016 | Golec | ................. | G06F 16/2445 |
| | | | | 707/E17.045 |

\* cited by examiner

DATA MODEL VIEW WITH COMPLEX CALCULATION CAPABILITY

TECHNICAL FIELD

The present disclosure relates generally to computer systems, and more specifically, to a framework for developing a data model view with complex calculation capability.

BACKGROUND

A data model represents a framework that organizes elements of data and standardizes how they relate to one another in a database. Data models provide a standardized method for defining and formatting database contents consistently across systems, enabling different applications to share the same data. Professional data modeling tools provide a way to generate structured query language (SQL) from a modeled entity relationship (ER) diagram.

Some data models are defined and consumed in the database layer rather than in the application layer (or server). One such example is SAP Core Data Services (CDS), which is a data modeling infrastructure that provides a Data Definition Language (DDL) for defining semantically rich database tables/views (CDS views) and user-defined types in the database. CDS provides support for conceptual modeling and relationship definitions, built-in functions, and extensions.

Data models may be defined as views (e.g., CDS views), which can be used in applications (e.g., Fiori Apps) to enable access to the database. Data model views may be created as design-time files and natively integrated into the database layer to take advantage of in-memory database computing (e.g., SAP HANA) to achieve good performance for high data volume. However, the database layer is unable to handle customized complex calculations. Such customized calculations are typically programmed within the application using an application programming language (e.g., SAP ABAP). Application logic (e.g., data reading, processing, output), programmed using such application programming language, is suitable for processing small to medium data volumes and customized complex calculations.

The application is typically executed within an application layer (e.g., SAP Netweaver), while the data model view is run within the database layer (e.g., SAP HANA). Therefore, application logic may only be inserted before or after the execution of the data model (e.g., CDS view). It is not possible to invoke application logic within the execution of the data model view. For those applications that require complex calculations on top of high data volume, complex calculation logic may be re-implemented within the data model view, which is not good at handling complex calculations. Alternatively, results from the data model view are processed again in the application, which is not good at handling large data volumes.

SUMMARY

A framework for providing data model views with complex calculation capability is described herein. In accordance with one aspect, the framework receives a request to calculate target results. An object in an application layer may be invoked to perform complex calculation to generate intermediate results. The intermediate results are stored in a global temporary table. A data model view in a database layer may then be invoked to calculate the target results based on the intermediate results retrieved from the global temporary table. The calculated target results are then returned.

With these and other advantages and features that will become hereinafter apparent, further information may be obtained by reference to the following detailed description and appended claims, and to the figures attached hereto.

BRIEF DESCRIPTION OF THE DRAWINGS

Some embodiments are illustrated in the accompanying figures, in which like reference numerals designate like parts, and wherein.

DETAILED DESCRIPTION

In the following description, for purposes of explanation, specific numbers, materials and configurations are set forth in order to provide a thorough understanding of the present frameworks and methods and in order to meet statutory written description, enablement, and best-mode requirements. However, it will be apparent to one skilled in the art that the present frameworks and methods may be practiced without the specific exemplary details. In other instances, well-known features are omitted or simplified to clarify the description of the exemplary implementations of the present framework and methods, and to thereby better explain the present framework and methods. Furthermore, for ease of understanding, certain method steps are delineated as separate steps; however, these separately delineated steps should not be construed as necessarily order dependent in their performance.

A framework for providing data model views with complex calculation capability is described herein. One aspect of the present framework performs complex calculation to generate intermediate results in the application layer using an application programming language (e.g., SAP ABAP). The intermediate results may be stored in a global temporary table (GTT) that can be accessed by the data model view during runtime to calculate target results based on the intermediate results. Such features advantageously combine complex computing capability of the application programming language with high-performance data processing of high data volume in the database layer. The framework enables the data model to handle complex business logic without losing performance gains.

It should be appreciated that the framework described herein may be implemented as a method, a computer-controlled apparatus, a computer process, a computing system, or as an article of manufacture such as a computer-usable medium. These and various other features and advantages will be apparent from the following description.

Figure 1:
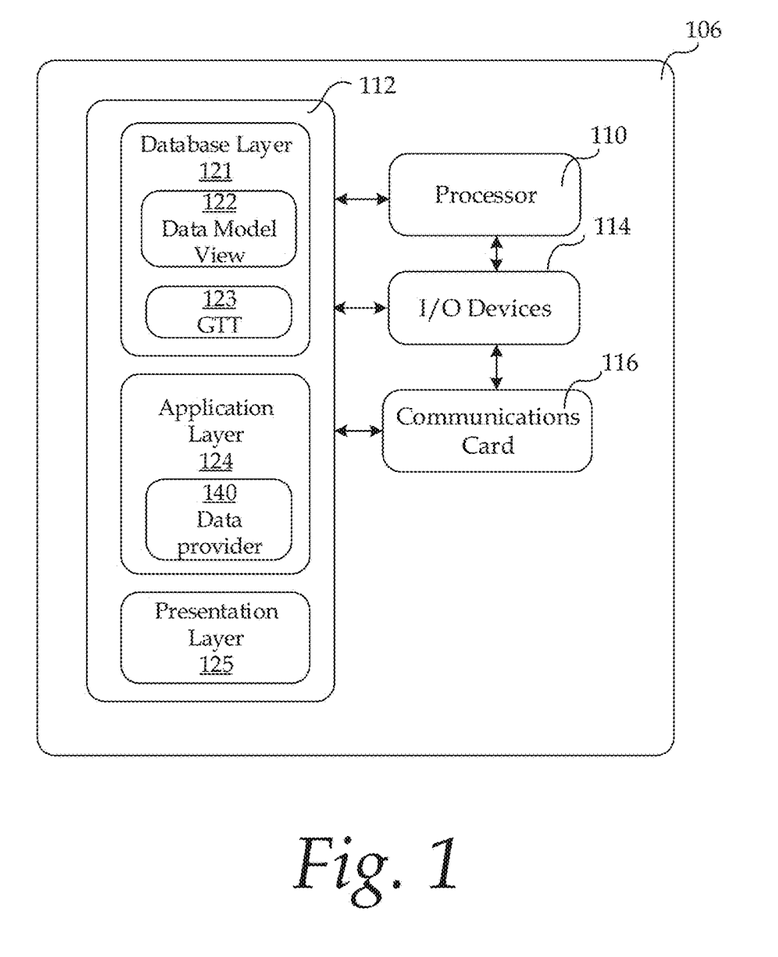
FIG. 1 is a block diagram illustrating an exemplary computer system.

FIG. 1 is a block diagram illustrating an exemplary computer system 106 in accordance with one aspect of the present framework. Computer system 106 is capable of responding to and executing machine-readable instructions in a defined manner. Computer system 106 may include a processor 110, input/output (I/O) devices 114 (e.g., touch screen, keypad, touch pad, display screen, speaker, etc.), a memory module 112, and a communications card or device 116 (e.g., modem and/or network adapter) for exchanging data with a network (e.g., local area network or LAN, wide area network (WAN), Internet, etc.). It should be appreciated that the different components and sub-components of the computer system 106 may be located or executed on different machines or systems. For example, a component may be executed on many computer systems connected via the network at the same time (i.e., cloud computing).

Memory module 112 may contain any form of non-transitory computer-readable media, including, but not limited to, dynamic random access memory (DRAM), static random access memory (SRAM), Erasable Programmable Read-Only Memory (EPROM), Electrically Erasable Programmable Read-Only Memory (EEPROM), flash memory devices, magnetic disks, internal hard disks, removable disks or cards, magneto-optical disks, Compact Disc Read-Only Memory (CD-ROM), any other volatile or non-volatile memory, or a combination thereof. Memory module 112 serves to store machine-executable instructions, data, and various software components for implementing the techniques described herein, all of which may be processed by processor 110. As such, computer system 106 is a general-purpose computer system that becomes a specific-purpose computer system when executing the machine-executable instructions. Alternatively, the various techniques described herein may be implemented as part of a software product. Each computer program may be implemented in a high-level procedural or object-oriented programming language (e.g., C, C++, Java, JavaScript, Advanced Business Application Programming (ABAP™) from SAP® AG, Structured Query Language (SQL), etc.), or in assembly of machine language if desired. The language may be a compiled or interpreted language. The machine-executable instructions are not intended to be limited to any particular programming language and implementation thereof. It will be appreciated that a variety of programming languages and coding thereof may be used to implement the teachings of the disclosure contained herein.

In some implementations, computer system 106 serves as a Web Application Server. Memory module 112 may include a three-tiered architecture in which the computer data storage and data access (database), functional process logic (application), and user interface (presentation), are developed and maintained as independent modules. More particularly, the three-tiered architecture may be implemented as a database layer 121, an application layer 124 and a presentation layer 125. It should be appreciated that these layers (121, 124, 125) may run on the same or on different physical machines.

Database layer 121 contains a relational database and database management system. In some implementations, the database layer 121 includes an in-memory database system, such as SAP HANA. In addition, the database layer 121 may include one or more data model views 122. Data model view 122 may be natively integrated with the database layer 121 and may be created as a design-time file in the database that can be read by applications in the application layer 124 to enable access to the database. An exemplary data model view 122 is the SAP Core Data Services (CDS) view. During operation, the database layer 121 may further include a global temporary table (GTT). GTT 123 is accessible to the data model view 122 and serves to store intermediate results computed by an object in the application layer 124.

Application layer 124 is a logical tier that controls functionalities of applications by performing detailed processing. Application processes, including transactions and application development, run on application layer 124. Application layer 124 further includes a data provider 140. Data provider 140 is a class (e.g., OData class) that provides access to the data model view 122 with complex calculation capability. Presentation layer 125 handles interaction with users of the system 106. Online access to application servers can be provided via a proprietary graphical user interface (e.g., SAP GUI) or via a Web browser.

Figure 2:
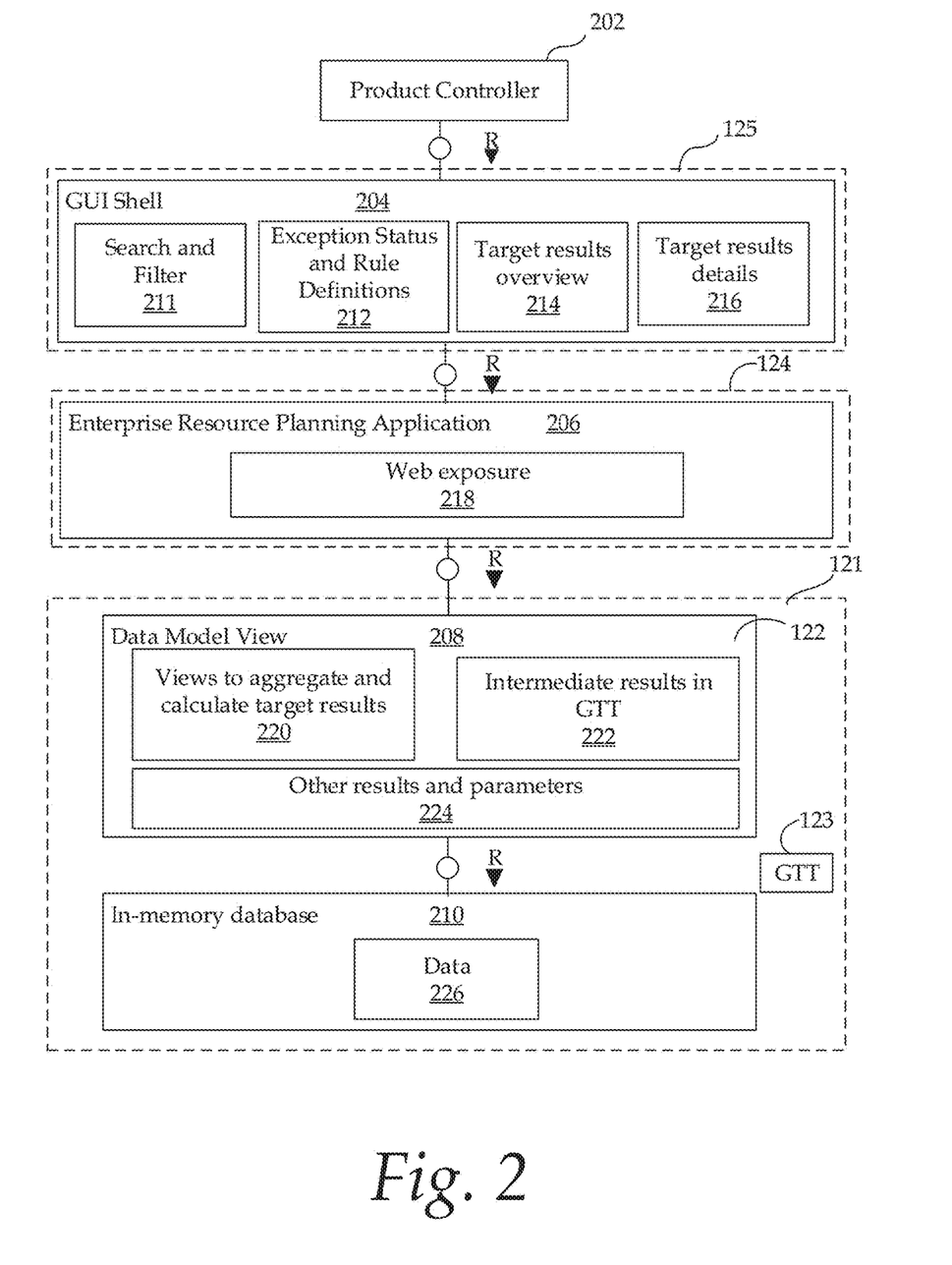
FIG. 2 shows exemplary database, application and presentation layers.

FIG. 2 shows exemplary database, application and presentation layers (121, 124 and 125). A product controller (or any other user) 202 interacts with the presentation layer 125 and invokes functions via a graphical user interface (GUI) shell 204 (e.g., Fiori shell). The GUI shell 204 displays a user interface to provide access to a search and filter function 211, exception status and rule definitions 212, a target results overview 214 (e.g., production costs with exception status or by cost component group) and target results details 216 (e.g., target or actual costs by general ledger (GL) account, business transaction or cost component, work in process).

The GUI shell 204 communicates with an enterprise resource planning (ERP) application 206 (e.g., SAP S/4 HANA) running in the application layer 124, which provides Web exposure 218 (e.g., OData exposure via Service Adaptation Description Language SADL). Application layer 124 may further include other objects (e.g., ABAP function module) capable of performing complex calculations.

The ERP application 206 communicates with a data model view 208 (e.g., SAP CDS view) running in the database layer 121. The data model view 208 includes views 220 to aggregate and calculate the target results (e.g., production costs). In order to achieve that, it retrieves intermediate results 222 from GTT 123 and stores other results and parameters 224 (e.g., production costs by orders, order production costs cube, orders, object status, actual costs, planned and target costs, WIP and variances, quantities, etc.).

The data model view 208 communicates with the in-memory database 210 which also runs in the database layer 121. The in-memory database stores data (or data tables) 226.

Figure 3:
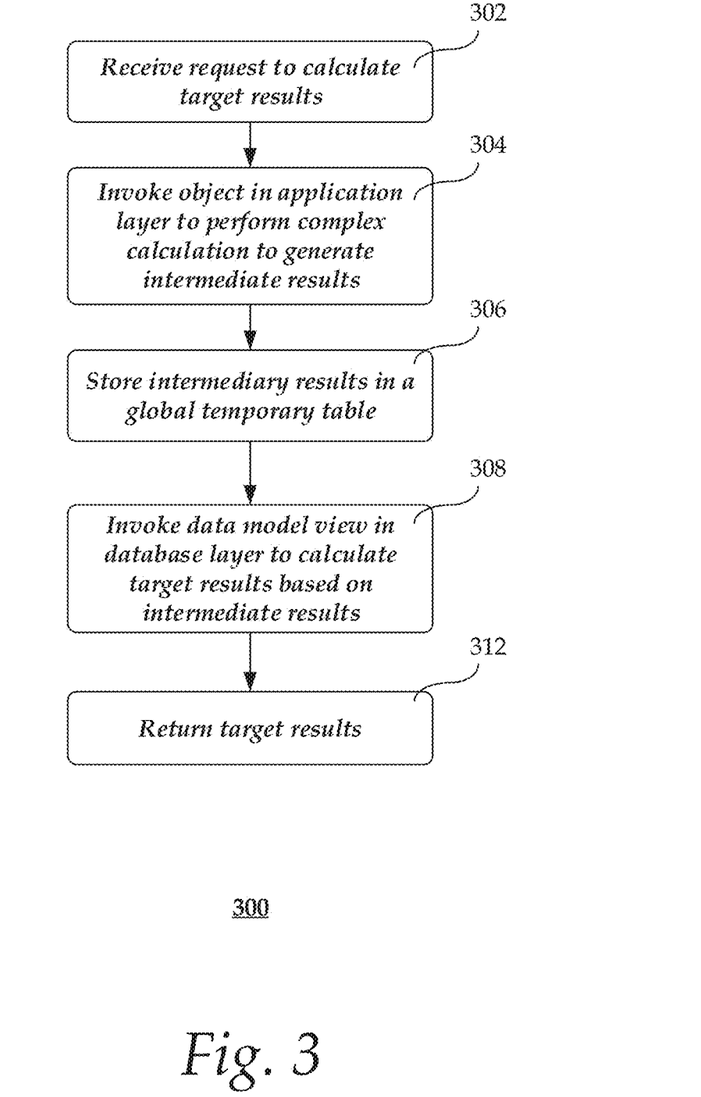
FIG. 3 shows an exemplary method for providing data model views with complex calculation capability.

FIG. 3 shows an exemplary method 300 for providing data model views with complex calculation capability. The method 300 may be performed automatically or semi-automatically by the components of computer system 106, as previously described with reference to FIGS. 1 and 2. It should be noted that in the following discussion, reference will be made, using like numerals, to the features described in FIGS. 1 and 2.

At 302, data provider 140 receives a request to calculate target results. Data provider 140 is a class (e.g., OData class) that runs in the application layer 124. Data provider 140 may receive the request from, for example, a GUI shell 204 in the presentation layer 125. The target results may be the results of any analysis that depends on some intermediary results that require complex calculation. Such complex calculation is suited to be performed by an application programming language (e.g., ABAP) to achieve high performance.

At 304, data provider 140 invokes an object in the application layer 124 to perform complex calculation to generate intermediate results. The object may be a function, a function module, a program, a class method, or any other callable or executable entity. The object may be preexisting and reside within the application layer 124. The object is programmed using an application programming language (e.g., ABAP) that is capable of performing complex calculations with high performance. The term "complex" generally refers to a type of calculation that usually requires many lines of code (e.g., hundreds or thousands of lines) to be implemented by an application programming language, which is typically not possible to be implemented within the data model view 122.

At 306, data provider 140 stores the intermediate results in a global temporary table (GTT) 123. GTT 123 is a temporary data structure that is created to store data accessible by the data model view 122. Definition of the GTT 123 is made globally available to any of the database connections once created. In other words, metadata of the GTT 123 may be shared across database sessions. Such metadata defines properties of the GTT 123, such as its name, size and location. However, the contents of the GTT 123 may not be shared between database sessions. Each session sees only its own content of the table. Compiled commands that reference the GTT 123 are not shared among sessions. Accordingly, GTT 123 guarantees data separation of temporary intermediate results calculated by the object in the application programming language (e.g., ABAP).

At 308, data provider 140 invokes data model view 122 in database layer 121 to calculate target results based on the intermediate results. In response to the invocation, data model view 122 loads the intermediate results from the GTT 123 and calculates the target results. Data model view 122 may combine the intermediate results with other kinds of data to generate the target results.

At 312, data provider 140 returns the target results. The target results may be returned to the presentation layer 125. The target results may be displayed by, for example, the GUI shell 204. Data provider 140 then deletes contents of the GTT 123 for a database session when the session closes. GTT 123 is truncated when the last connection using it is closed.

Figure 4:
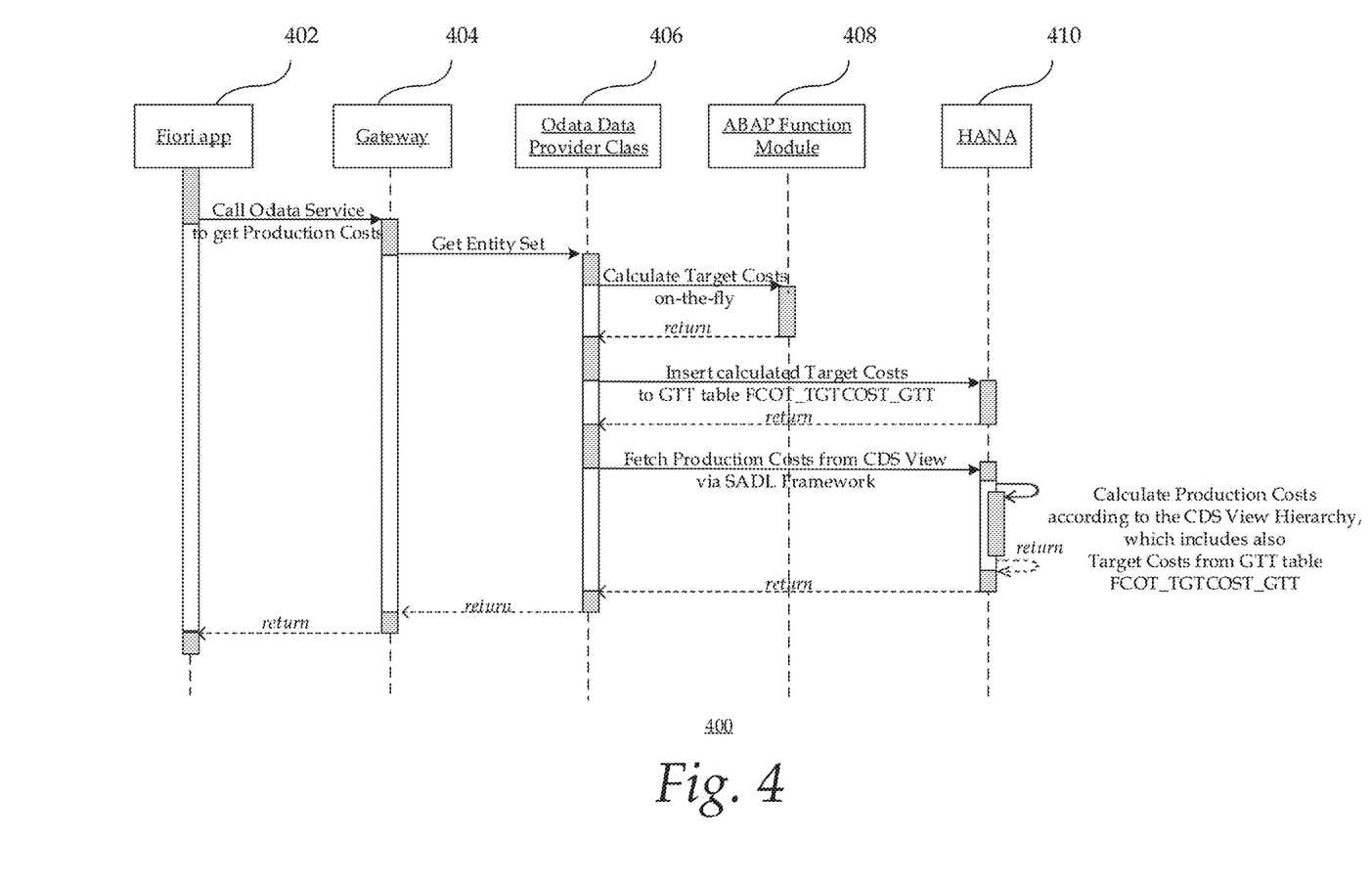
FIG. 4 shows an exemplary sequence diagram.

FIG. 4 shows an exemplary sequence diagram 400. In this exemplary sequence diagram 400, an SAP Fiori App 402 provides a "Production Costs Analysis" function. To perform such analysis, Target Costs (i.e., intermediate results) need to be calculated on-the-fly for a selected Order, and then combined with other kinds of data (or results), such as Actual Costs, Plan Costs, Work in Process (WIP) and Variances, Quantities, etc., so as to calculate the final Order Production Costs (i.e., target results).

In response to the user invoking the "Production Costs Analysis" function, Fiori App 402 issues a request to an OData Service to get "Production Costs". Upon receiving the request, Gateway 404 issues a request to "Get Entity Set" to OData Data Provider Class 406. OData Data Provider Class 406 then invokes ABAP function module 408 to calculate Target Costs on-the-fly. OData Data Provider Class 406 then inserts the calculated Target Costs into a GTT. OData Data Provider Class 406 further issues a request to in-memory database SAP HANA 410 to fetch Production Costs from a CDS view via SAP SADL framework. SAP HANA 410 then calculates Production Costs according to the CDS view hierarchy which also includes Target Costs fetched from the GTT.

Figure 5:
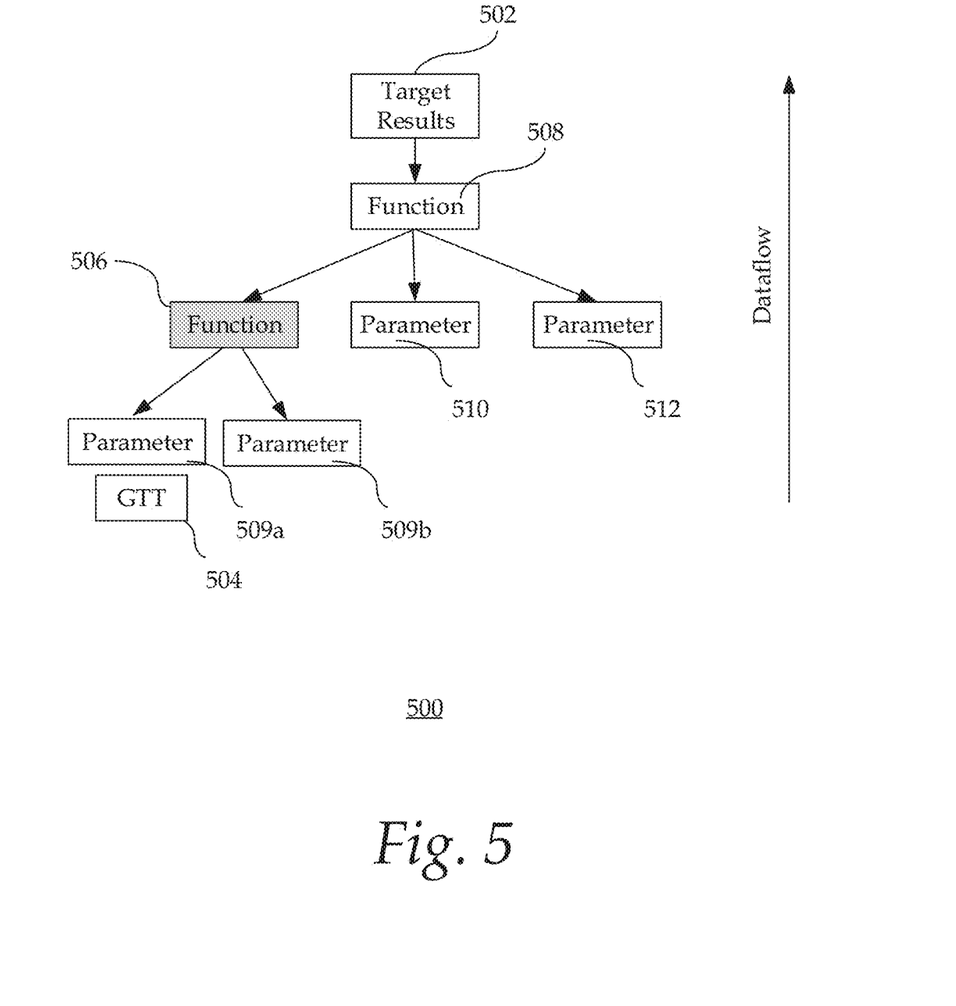
FIG. 5 shows an exemplary data model view hierarchy.

FIG. 5 shows an exemplary data model view hierarchy 500. Each non-leaf node represents a function, while each leaf node represents a parameter value. Each parent (non-leaf) node is calculated based on its corresponding child nodes. Root node 502 represents the final target results. Function 506 may be provided by application layer 124, while function 508 may be provided by database layer 121. GTT 504 is used to store the intermediate results generated by function 506 based on parameter values 509a-b. Function 508 then uses the intermediate results stored in GTT 504 and parameter values 510 and 512 to calculate the target results 502.

Although the one or more above-described implementations have been described in language specific to structural features and/or methodological steps, it is to be understood that other implementations may be practiced without the specific features or steps described. Rather, the specific features and steps are disclosed as preferred forms of one or more implementations.

The invention claimed is:

1. A computer system, comprising:
one or more non-transitory memory devices for storing computer-readable program code within a database layer, an application layer, and a presentation layer; and
one or more processors in communication with the one or more memory devices, the one or more processors being operative with the computer-readable program code to perform operations comprising:
receiving, by the application layer, a request to calculate target results;
in response to receiving the request to calculate target results, invoking, by the application layer, an object in the application layer to perform complex calculation to generate intermediate results;
sending the intermediate results from the application layer to the database layer;
storing, by the database layer, the intermediate results in a global temporary table residing in the database layer;
invoking, by the application layer, a data model view in the database layer to calculate the target results based at least in part on the intermediate results;
by the database layer, retrieving at least a portion of the intermediate results from the global temporary table;
by the database layer, calculating the target results based at least in part on the retrieved at least a portion of the intermediate results;
sending the target results from the database layer to the application layer; and
returning, by the application layer to the presentation layer, the target results.

2. The system of claim 1, wherein the invoking and returning are carried out by a data provider implemented in the application layer.

3. The system of claim 1 wherein the object comprises a function module programmed using Advanced Business Application Programming ("ABAP").

4. The system of claim 1 wherein the data model view is a design-time file readable by applications in the application layer to enable access to a database.

5. The system of claim 1 wherein the database layer comprises an in-memory database system.

6. The system of claim 1 wherein the processor is operative with the computer-readable program code to send, in response to a user invoking a function via a graphical user interface ("GUI") shell in the presentation layer, the request to the application layer to calculate the target results.

7. The system of claim 1 wherein the object comprises a function, a function module, a program or a class method preexisting within the application layer.

8. The system of claim 1 wherein metadata of the global temporary table across database sessions without sharing the intermediate results.

9. The system of claim 1 wherein the target results are returned to the presentation layer for display via a graphical user interface ("GUI") shell.

10. The system of claim 1 wherein the processor is operative with the computer-readable program code to delete contents of the global temporary table for a database session when the database session closes.

11. A method, implemented in a computing environment comprising one or more processors and one or more memories coupled to the one or more processors, comprising:
   receiving, by an application layer, a request to calculate target results;
   invoking an object in the application layer to perform complex calculation to generate intermediate results;
   sending the intermediate results from the application layer to a database layer;
   storing the intermediate results in a global temporary table maintained in the database layer;
   retrieving, by the database layer, at least a portion of the stored intermediate results;
   calculating the target results based at least in part on the intermediate results retrieved by the database layer from the global temporary table; and
   returning the target results to the application layer.

12. The method of claim 11 wherein invoking the object comprises invoking a function, a function module, a program or a class method preexisting within the application layer.

13. The method of claim 11 further comprises sharing metadata of the global temporary table across database sessions.

14. The method of claim 11 further comprises loading the intermediary results from the global temporary table in response to invoking a data model view.

15. The method of claim 11 further comprises calculating the target results by combining the intermediate results with other data.

16. The method of claim 11 wherein returning the target results comprises returning the target results to a presentation layer for display via a graphical user interface ("GUI") shell.

17. The method of claim 11 further comprises deleting contents of the global temporary table for a database session when the database session closes.

18. One or more non-transitory computer-readable media having stored thereon program code, the program code executable by a computer to perform operations comprising:
   receiving a request to calculate target results;
   performing complex calculation at an application layer to generate intermediate results;
   sending the intermediate results from the application layer to a database layer;
   storing the intermediate results in a global temporary table maintained in the database layer;
   by the database layer, retrieving the intermediate results from the global temporary table;
   calculating, by the database layer, the target results based at least in part on the intermediate results retrieved from the global temporary table; and
   returning the target results from the database layer to the application layer.

19. The one or more non-transitory computer-readable media of claim 18 wherein the program code is executable by the computer to calculate the target results by combining the intermediate results with other data.

20. The one or more non-transitory computer-readable media of claim 18 wherein the program code is executable by the computer to load the intermediary results from the global temporary table in response to invoking a data model view.

* * * * *